May 1, 1951 F. B. HARKNESS 2,550,692
DEVICE FOR GRAPHICALLY REPRESENTING FLOOD CONDITIONS
Filed Sept. 9, 1948 2 Sheets-Sheet 1
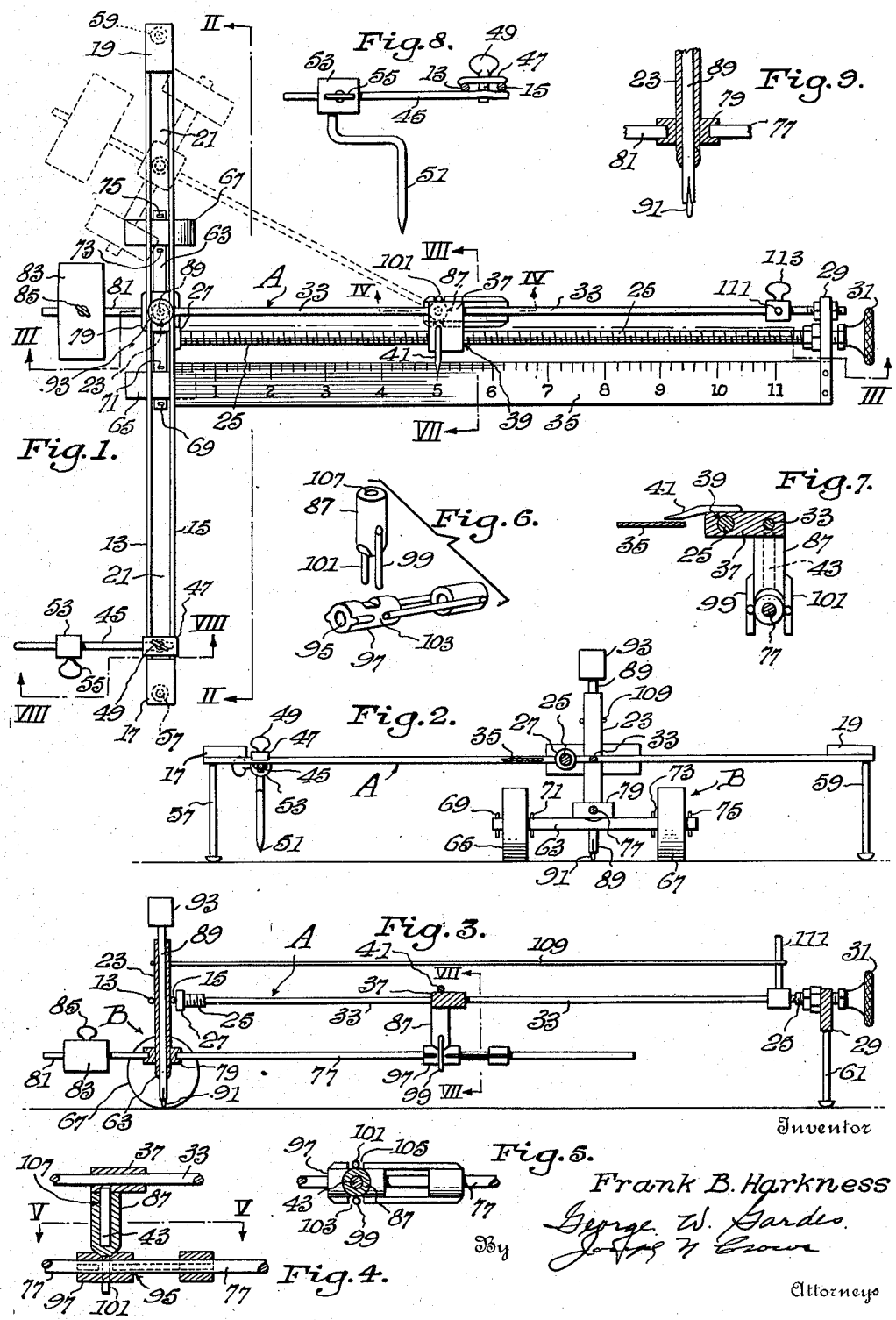
Inventor
Frank B. Harkness May 1, 1951     F. B. HARKNESS     2,550,692
DEVICE FOR GRAPHICALLY REPRESENTING FLOOD CONDITIONS
Filed Sept. 9, 1948     2 Sheets-Sheet 2
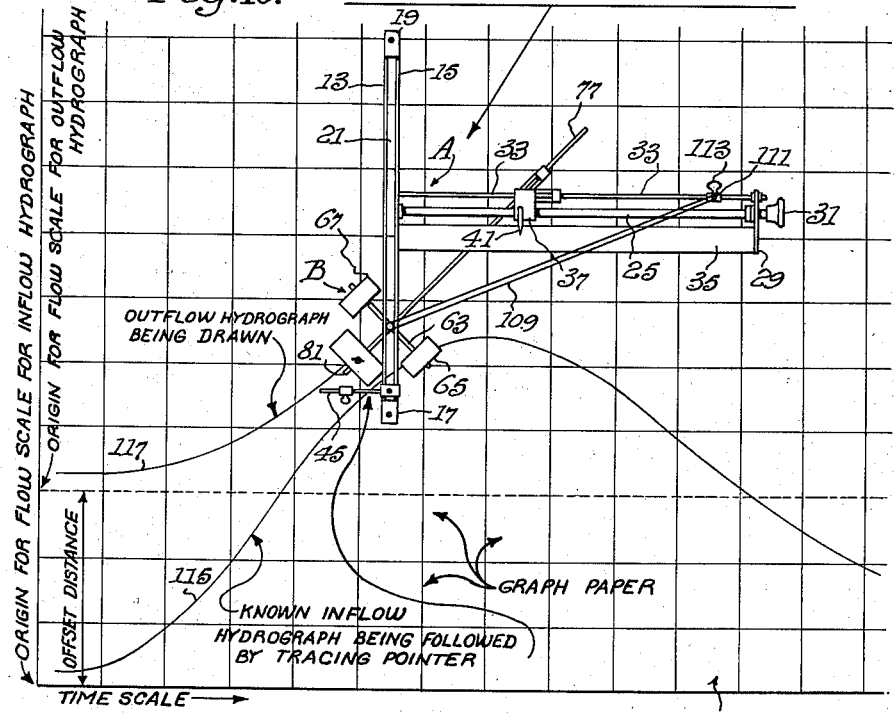
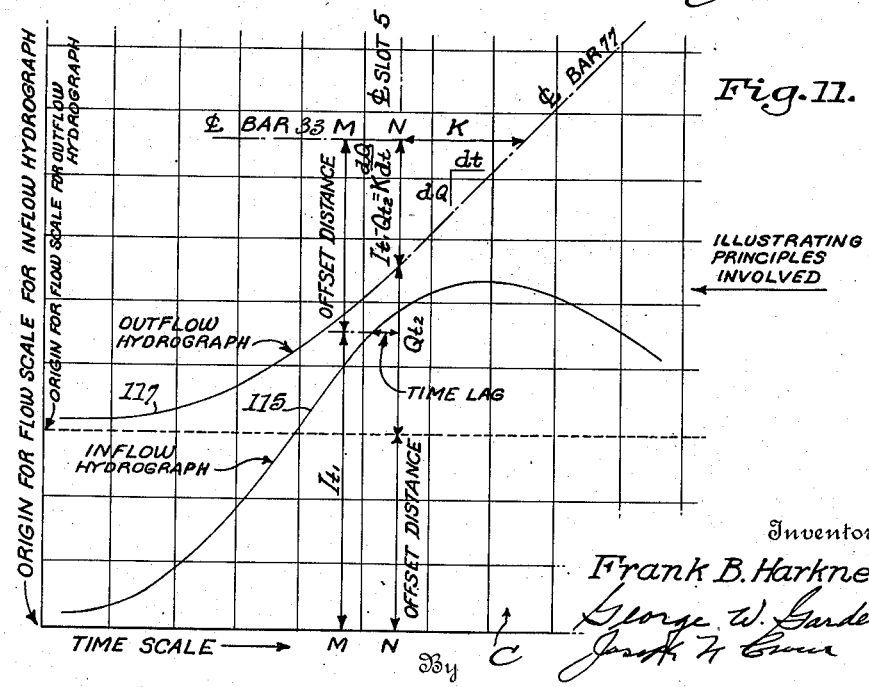

Patented May 1, 1951

2,550,692

UNITED STATES PATENT OFFICE 2,550,692

DEVICE FOR GRAPHICALLY REPRESENTING FLOOD CONDITIONS

Frank B. Harkness, Louisville, Ky.

Application September 9, 1948, Serial No. 48,526

6 Claims. (Cl. 33—27)

(Granted under the act of March 3, 1883, as amended April 30, 1928; 370 O. G. 757)

The invention described herein may be manufactured and used by or for the Government for governmental purposes, without payment to me of any royalty thereon.

The present invention provides an improved instrument for use in connection with the studies of flood conditions in flooded rivers and streams, with particular reference to the determination of the manner of directing flood waters in given reaches of a flooded stream into flood control basins provided for the purpose of receiving such flood waters for eliminating or minimizing the amount of overflow from the river banks.

The present invention provides a simplified plotting instrument for these studies, wherein the flood conditions in given reaches of a river may be plotted readily and rapidly, with the minimum of inaccuracies resulting from accidental displacement of the instrument during use.

A further object of the invention is to produce an instrument which is simple in construction and readily and rapidly usable for producing outflow hydrographs from plotted inflow hydrographs, its principal adaptation being for routing floods through reaches of rivers in connection with flood studies.

Further objects of the present invention reside in the details of construction, the arrangements and combination of parts, and operation of the device as hereinafter described and claimed, reference being had to the accompanying drawings forming a part hereof, wherein like numerals refer to like parts throughout.

In the drawings:

Fig. 1 represents a plan view of the improved plotting instrument of this invention;

Fig. 2 is a transverse sectional elevation thereof, taken on the line II—II of Fig. 1, looking in the direction of the arrows;

Fig. 3 is a still further sectional elevation, but looking in a longitudinal direction, through the device taken on the line III—III of Fig. 1, looking in the direction of the arrows;

Fig. 4 is a fragmentary sectional elevation of the carriage means of the device of the invention, the view being taken on the line IV—IV of Fig. 1, looking in the direction of the arrows, and showing further details of a swivel mounting for the undercarriage of the device;

Fig. 5 is a sectional plan view, taken on the line V—V of Fig. 4, looking in the direction of the arrows;

Fig. 6 is a disconnected perspective view showing parts of a sliding swivel connection for the undercarriage of the device;

Fig. 7 is a sectional elevation taken on the line VII—VII of Figs. 1 and 3, looking in the direction of the arrows, the view showing the parts of Fig. 6 in assembled relation;

Fig. 8 is a fragmentary sectional elevation taken on the line VIII—VIII of Fig. 1, looking in the direction of the arrows, the view showing details of the mounting of the tracing pointer;

Fig. 9 is an enlarged sectional elevation of the mounting for the marking device, showing in enlarged details the mounting of the marking device shown in Fig. 3;

Fig. 10 is a diagrammatic view, showing the device of the present invention in plan, the view illustrating the method of operation of the instrument of the present invention;

Fig. 11 is a graph showing the principles interpreting the graph drawn by the instrument as shown in Fig. 10.

Reference in detail to the various views of the drawings will be indicated hereinafter. Generally speaking, the instrument of the invention comprises a framework carrying a tracing pointer which is moved along a plotted inflow hydrograph, while an undercarriage which is attached to the framework by a linkage arrangement, carries a pen or pencil which draws a hydrograph of the outflow. The difference between the rates of flow of the inflow hydrograph being traced and the hydrograph being drawn, is equal to a storage factor K multiplied by the slope or rate of change of flow of the outflow hydrograph. The storage factor K is a characteristic of reaches of streams, and the device is readily adjustable to any K value, the K setting being indicated by a pointer on a scale. When it is appropriate to introduce time lag into the routing process, the tracing pointer is set back to the left a distance representing the time lag at the time scale of the hydrographs and the device then will draw the outflow hydrograph translated to the right, or later on the time scale by that amount of time. When running the pencil pointer over the inflow hydrograph, it is important that the guide bars be kept substantially parallel with the ordinate axis and to facilitate this, the device may be mounted in a drafting machine if desired.

The undercarriage of the device of this invention normally is in what may be termed its neutral position. In operation, it swings through other positions as determined and as will be seen from the drawings. In any position the distance in the ordinate direction that the pencil or pen is displaced from its neutral position is equal to the K distance times the slope of the steering bar of the undercarriage that passes through the sliding point, which in turn determines the direction of travel of the pen or pencil, and thus the rate of change of flow represented by the outflow hydrograph being produced.

The tracing pointer is set a distance away from the neutral position of the pen or pencil so that the pointer will not interfere with the swinging of the undercarriage and, by making this distance, measured parallel to the guide bars, equal to an integral number of divisions of the graph paper being worked on, the scale of the outflow hydrographs will be offset in the direction of ordinates in amount equal to the said integral number of divisions, but otherwise the scales of the inflow and outflow hydrographs will be the same.

Referring more particularly to the drawings, it will be seen that the instrument of the present invention comprises two main components, namely, an upper T-shaped frame, designated generally at A on the drawings, and an undercarriage B, the movements of which are guided by the movements of the upper framework. The upper framework has two parallel guide bars 13, 15 which are fastened rigidly at their ends to blocks 17, 19. These bars form a horizontal slot 21 in which a pencil part 23 of the undercarriage B slides freely. Mounted in the framework at right angles to the guide bars 13 and 15 is a horizontal worm screw 25, one end of which is freely-rotatably supported in a bearing 27 attached to the side of guide bar 15 near the mid-point of its length. The forward end of the worm screw 25 passes through a hole in end plate 29 and is freely-rotatably supported thereby. A knurled knob 31, which is attached rigidly to the forward end of the worm screw 25, provides for convenience in rotating the worm screw manually.

A nut guide rod 33 is mounted parallel to the worm screw 25 and a short distance therefrom, the guide rod 33 having one end rigidly attached to the bar 15 and the opposite end rigidly attached to the end plate 29.

A scale piece 35 is mounted parallel to the worm screw 25 and a short distance therefrom, the scale piece 35 having one end rigidly attached to the guide bar 15 and its outer end rigidly attached to the end plate 29. Lines and numerals are inscribed on the scale piece as shown in Fig. 1, so as to indicate the "K" setting referred to above.

The rod 33 slidably carries a nut member 37 thereon, this nut member being provided with a plain hole extending through it for enabling it to slide freely along the guide rod 33, and a threaded hole 39 through which the worm screw 25 passes, so that the nut 37 freely moves along the worm screw by the rotation of this screw. Rigidly attached to the nut piece or member 37 is a sharp pointer 41, the sharp end of which extends slightly over the scale piece 35 and is adapted to indicate the "K" setting on the scale inscribed on the scale piece 35. The nut member 37 also is connected rigidly to a swivel post 43 that extends downwardly from the nut member 37.

The guide bars 13 and 15 carry adjustably thereon a tracing pointer support bar 45, the mounting of the support bar 45 being by means of a clip 47 and thumb screw 49, the support bar extending backwardly and horizontally relative to the guide bar 13. The tracing pointer 51 is attached rigidly to a sleeve 53 which is freely slidable on tracing pointer support 45, so that the tracing pointer 51 extends downwardly with its end close to the sheet of graph paper C. The position of the sleeve 53 on the tracing pointer support bar 45 may be adjusted and locked in any position by a thumb screw 55 so as to represent any desired time lag.

The instrument frame is supported on three legs 57, 59, 61, there being one of such legs at each extremity of the framework. These legs are rounded at their lower ends for freely sliding over the paper C when the instrument is being used.

The undercarriage B is provided with an axle 63 on the ends of which are mounted freely rotatably the wheels 65, 67, which are retained in their positions on the axles by cotter pins 69, 71, 73, 75. The peripheries of the wheels 65, 67 are composed of friction material to resist side slipping of the undercarriage B on the paper C, and to constrain the movements of the wheels to the direction of the undercarriage bar 77, which will be referred to in greater detail hereinafter.

Rigidly attached to the center of the axle 63 is an axle block 79. Rigidly attached to this axle block and extending therefrom horizontally and perpendicularly to the axle 62, and midway between the two wheels 65 and 67 is the undercarriage steering bar 77, mentioned above. Rigidly attached to the back of the axle block 79 and extending therefrom in a direction opposite to that of the undercarriage steering bar 77 is a bar 81 which passes through a hole in a weight 83. This weight is freely-slidably mounted on the bar 81, and the position may be adjusted and secured by a set screw 85 so as to maintain a suitable amount of upward pressure at the swivel mounting 87 of the bar 81. The pencil guide post 23 is attached rigidly to the top of the axle block 79, and extends vertically upwardly therefrom midway between the two wheels 65 and 67 and directly over the axle 63. This post is a hollow tube, and its longitudinal hole is extended downwardly through the axle block 79 and axle 63 so as to receive in a free fit the pencil 89 which in use is placed in this hole with the scribing end downward so that the lead 91 marks on the paper C. A weight 93 is placed over the top of the pencil, the upper portion of which fits freely into a hole which extends part way through the weight. The weight 93 produces the desired pressure of the pencil lead 91 against the paper C so that the pencil mark will be clearly legible.

The undercarriage steering bar 77 passes freely slidably through hole 95 in a swivel slide piece 97. The swivel yoke mounting 87 has two extending prongs 99, 101, which fit freely in the slots 103, 105 in the swivel joint slide piece 97. The swivel yoke 87 is provided with a vertical hole 107 which fits freely both slidably and rotatably on swivel post 43.

An elastic, resilient member, for example a rubber band, 109, has one end looped around the pencil post 73 and the other end is looped around the vertical rubber band holding post 111, which is slidably mounted on the nut guide bar 33 and may be locked in various positions by the thumbscrew 113 so as to maintain the most suitable direction and magnitude of the pull exerted by the rubber band 109 on the pencil post 73. This pull materially assists the undercarriage in rolling in the direction of the undercarriage steering bar 77 without sliding on the paper C when the angle between the undercarriage steering bar 77 and the nut guide bar 33 is large.

As has been indicated above, the instrument is designed especially for the routing of floods in rivers. As an example of such use, suppose it is required to determine the flows at the lower end of a reach of river that would result from a flood entering at the upper end of the reach, having the "K" values and time lag appropriate to that reach of the river determined from prior studies.

Now, let the flow into the reach be represented by the inflow hydrograph 115, Fig. 10. First, the position of the tracing pointer supporting bar 25 on the guide bars 13, 15, is adjusted so that the offset distance, which is the perpendicular distance between the nut guide bar 33 and the tracing pointer-supporting bar 45, is equal to an integral number of principal divisions of the graph paper so that the origin of the flow scale of the outflow hydrograph 117 will fall exactly upon a principal line of the graph paper C. With the origin at the principal line, the flow scale of the outflow hydrograph 117 is marked on the graph paper, using the same amount of flow per inch or other unit as was used in plotting the inflow hydrograph. The position of the tracing pointer 51 on the tracing pointer support bar 45 is then adjusted so that the time lag distance, at the time scale to which the inflow hydrograph is plotted, is that known to be appropriate. The "K" setting known to be appropriate is next secured by turning the knob 31. The units frequently used in flood routing are cubic feet per second for flow and day second feet for storage in the reach and as the "K" factor represents the ratio of change in storage to change in flow, it has the dimension days when these units are used. Therefore, in securing the proper "K" setting, the "K" distance shown by Fig. 1 is made equal to the appropriate "K" value at the time scale to which the inflow hydrograph is plotted. The time scale to which the inflow hydrograph is plotted should not be so small in relation to the flow scale that the correspondingly small "K" distance will result in requiring the instrument to operate at undesiredly large angles between the undercarriage steering bar 77 and the nut guide bar 33, as the possibility of skidding of the undercarriage wheels 65, 67 on the paper C increases as the angle increases.

After making the foregoing adjustments, the instrument is positioned on the graph paper C with the tracing pointer 51 over the inflow hydrograph 115 at a point near the beginning of the flood where it is desired to begin the routing. The undercarriage then is placed in such position that the pencil point 91 is at the outflow value known or assumed to be effective at the beginning of the flood. The operator then moves the upper framework A in such manner that the tracing pointer 51 follows along the inflow hydrograph 115, being careful at the same time to keep the pencil post guide bars 13 and 15 parallel to the lines of the graph paper running parallel with the ordinate axis. The movement of the upper framework A causes the undercarriage B to follow, the latter being steered by the undercarriage steering bar 77 and being pushed along by the guide bars 13 and 15 and pulled by the rubber band 109. The marking device (pencil or pen) 91, being carried along in the pencil guide post of the undercarriage, draws the desired outflow hydrograph 117, as illustrated in Fig. 10. In the event that the appropriate "K" values are known to be different for different rates of flow, the "K" setting is readjusted at intervals during the routing process by turning the knurled knob 31 so that the proper "K" value is used for each range of flow.

To illustrate principles of the instrument with regard to flood routing, let it be considered that the rate at which water is being stored in a reach of river is equal to the difference between simultaneous rates of inflow and outflow, $I-Q$, and is approximately equal to the storage factor "K" multiplied by the rate of change in outflow $$\frac{dQ}{dt}$$

(see Fig. 11). Furthermore, it is characteristic of flood flows for a given outflow, there is ordinarily more water in storage in a reach of river when the flood is rising than when it is falling, because there is more water flowing in the upper portion of the reach in the first case than in the second. Because of this condition, the accuracy of the flood routing is often improved by the introduction of a small amount of time lag, which in effect translates the developed outflow hydrograph to the right or later on the time scale. Fig. 11 is drawn with time lag shown therein, and with $I_{t_1}$ representing the inflow at time $t_1$ and $Q_{t_2}$ representing the desired outflow at times $t_2$, which is later than time $t_1$ by the amount of the time lag.

It is apparent by components of the lines M—M and N—N of Fig. 11 that the distance marked $$I_{t_1} - Q_{t_2} = K\frac{dQ}{dt}$$

is actually equal to $$I_{t_1} - Q_{t_2}$$

by construction, and by similar triangles, it is also equal to the storage factor "K" times the slope $$\frac{dQ}{dt}$$

of the outflow hydrograph being drawn, which slope is the same as the slope of the steering bar 77, inasmuch as the undercarriage always travels in the direction of the steering bar.

From the described method of operation and principles involved, it is obvious that conversely from the example given, had it been required to produce the inflow hydrograph that would cause a given outflow hydrograph, this could be accomplished by interchanging the tracing pointer and scribing element, and moving the framework so that the tracing pointer that would then be mounted on the undercarriage would follow the given outflow hydrograph, and the scribing element mounted on the framework would draw the desired inflow hydrograph. The framework of the instrument could be mounted if desired on a standard drafting machine to facilitate keeping the guide bars of the framework parallel to the ordinate axis while in operation.

While one embodiment and use of the invention has been shown, it will be understood that this is only for illustrative purposes and that many modifications can be made in the detailed construction and use of the instrument without departing from the spirit or scope of the invention; and it will be understood that it is intended and desired to embrace within the scope of this invention such modifications and changes that may be necessary to adapt it to varying conditions and uses, as defined by the appended claims.

Having thus described my invention, what I claim as new and wish to secure by Letters Patent is:

1. An instrument for plotting the routing of floods, which comprises, in combination, a framework, tracing means carried by the framework, instrumentalities enabling the tracing means to be laterally adjusted on the framework, an undercarriage carried by the framework, pivot means slidably mounted on the framework for swivelly connecting the undercarriage to the framework, a worm screw for longitudinally adjusting the pivot means, a scriber mounted on the undercarriage, a forwardly projecting arm pivotally connecting the framework and the undercarriage at the pivot means, and instrumentalities for causing the distance from the undercarriage to the pivot point to change automatically in a definitely controlled manner responsively to movement of the undercarriage about the pivot means while constraining movement of the undercarriage through a definite path with respect to the framework to which the undercarriage is connected.

2. An instrument for plotting the routing of floods, which comprises, in combination, a frame, tracing means carried by the frame, means enabling longitudinal and lateral adjustment of the tracing means relative to the frame, an undercarriage connected to the frame, scribing means mounted on the undercarriage, mounting wheels for the undercarriage having friction surfaces for inhibiting slipping of the undercarriage, a swivel mounting connecting the said undercarriage to the frame, a guide rod on the frame adapted to slidably support said swivel mounting means on the undercarriage for constraining the undercarriage to move in a definite path relative to the frame, a steering bar for the undercarriage for guiding the direction of travel of the undercarriage over a surface on which the instrument is being operated, a support on the frame adjacent to one end thereof, resilient tension means secured to the undercarriage and to the said support and acting on the undercarriage in the direction of the support, and means enabling adjustment of the said support relative to the frame for adjusting the location of the support on the frame for exerting a pull on the undercarriage in the direction of travel of the undercarriage over the surface on which the instrument is being operated.

3. An instrument for plotting the routing of floods, which comprises a frame having a slotted guide member and a stem member extending from the guide member at substantially right angles thereto, the guide member and stem member forming a substantially T-shaped frame, an undercarriage for the frame, tracing means mounted on the guide member, means enabling longitudinal and transverse adjustment of the tracing means relative to the guide member, a pivotal connection between the undercarriage and the frame, the pivotal connection being mounted in the slot of the slotted guide member, the said stem member of the frame including a worm screw mounted for predetermined rotation, a nut mounted on the screw for travel along the screw responsively to rotation of the screw, a swivel slide mounted on the nut, a forwardly extending arm of the undercarriage pivotally connected to the swivel slide and to the pivotal connection for the undercarriage in the said slotted guide member, a scale mounted adjacent to the said screw and extending parallel thereto, a pointer carried by the nut and extending over the scale to indicate the position of the nut, means for rotating the screw, spaced wheels for the undercarriage, and a scribing element mounted on the undercarriage at the pivotal connection between the undercarriage and the slotted frame member.

4. An instrument for plotting the routing of floods, which comprises a frame having a slotted guide member and a stem member extending from the guide member at substantially right angles thereto, the guide member and stem member forming a substantially T-shaped frame, an undercarriage for the frame, tracing means mounted on the guide member, means enabling longitudinal and transverse adjustment of the tracing means relative to the guide member, a pivotal connection between the undercarriage and the frame, the pivotal connection being mounted in the slot of the slotted guide member, a slide member mounted on the frame extending parallel to and adjacent to the stem member of the frame, the said stem member of the frame including a worm screw mounted for predetermined rotation, a nut mounted on the screw for travel along the screw responsively to rotation of the screw, a swivel slide mounted on the slide member and interconnected to the nut, a forwardly extending arm of the undercarriage pivotally connected to the swivel slide and to the pivotal connection for the undercarriage in the said slotted guide member, a scale mounted adjacent to the said worm screw and extending parallel thereto, a pointer carried by the said nut and extending over the said scale for indicating the position of the nut on the screw, means for rotating the screw, spaced wheels for the undercarriage, a scribing element mounted on the undercarriage at the pivotal connection between the undercarriage and the slotted frame member, and mounting means for the frame positioned at the ends of the frame.

5. An instrument for plotting the routing of floods which comprises a frame having a stem member and a guide member connected at right angles to said stem member, an undercarriage, a steering bar connected to said undercarriage, a swivel mounting supported on said stem member and longitudinally adjustable thereon, and a slide piece connected to said swivel mounting adapted to slidably receive the steering bar of said undercarriage, a tracing pointer longitudinally movable along said guide member and adapted to be set at a fixed position thereon, a tubular guide post connected to said steering bar and longitudinally movable along said guide member, a stylus mounted within said guide post, an axle block mounted on said guide post, an axle connected to said axle block, wheels mounted on said axle, and a supporting leg connected to said stem member and to each end of said guide member adapted to support said frame above said undercarriage to allow free movement of the undercarriage beneath said frame.

6. An instrument for plotting the routing of floods which comprises a frame having a stem member and parallelly arranged guide bars connected at right angles to said stem member, an undercarriage, a steering bar connected to said undercarriage, a swivel mounting including a nut member supported on said stem member and longitudinally adjustable thereon, a worm screw adapted to engage said nut member to effect longitudinal movement of said swivel mounting, a scale mounted on said stem member parallel to said worm screw, a slide piece connected to said swivel mounting adapted to slidably receive the steering bar of said undercarriage, a tracing pointer connected to and longitudinally movable along said guide member and adapted to be set at a fixed position thereon, a tubular guide post connected to said steering bar and longitudinally movable along said guide member, a stylus mounted within said guide post, an axle block mounted on said guide post, an axle connected to said axle block, wheels mounted on said axle, and a supporting leg connected to said stem member and to each end of said guide member adapted to support said frame above said undercarriage to allow free movement of the undercarriage beneath said frame.

FRANK B. HARKNESS.

REFERENCES CITED

The following references are of record in the file of this patent:

UNITED STATES PATENTS

| Number | Name | Date |
|---|---|---|
| 1,326,318 | Baca | Dec. 30, 1919 |
| 1,380,754 | van Bogaert | June 7, 1921 |
| 2,063,776 | Wozny | Dec. 8, 1936 |

FOREIGN PATENTS

| Number | Country | Date |
|---|---|---|
| 28,737 | Great Britain | 1910 |
| 94,040 | Switzerland | June 25, 1919 |